No. 830,379. PATENTED SEPT. 4, 1906.
A. T. STEARNS, DEC'D.
F. M. STEARNS, E. S. TENNY & J. F. DUNBAR, TRUSTEES.
SILO.
APPLICATION FILED MAR. 10, 1904
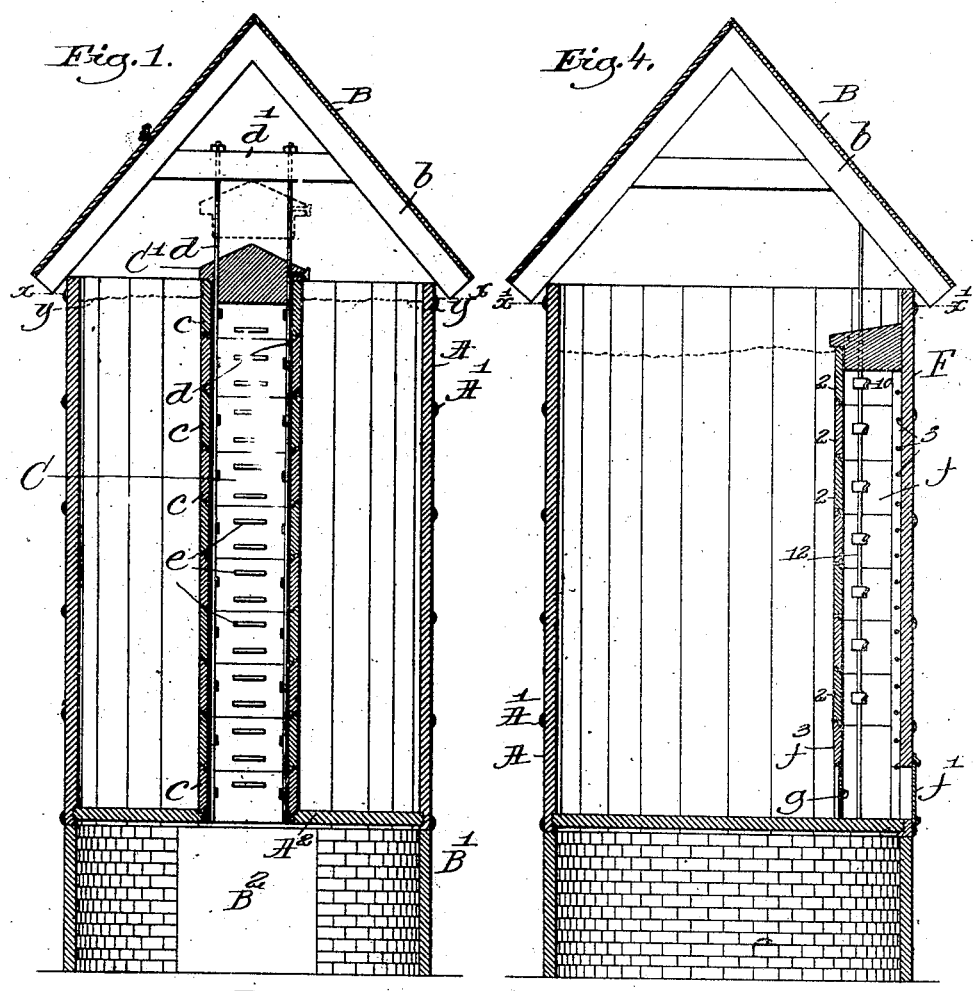
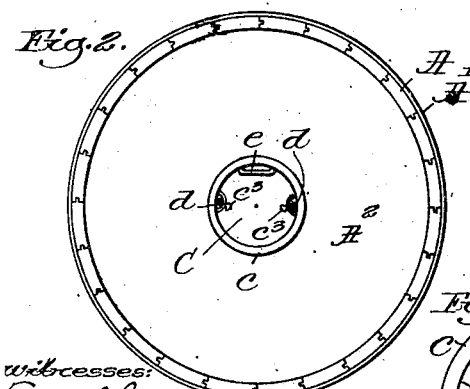
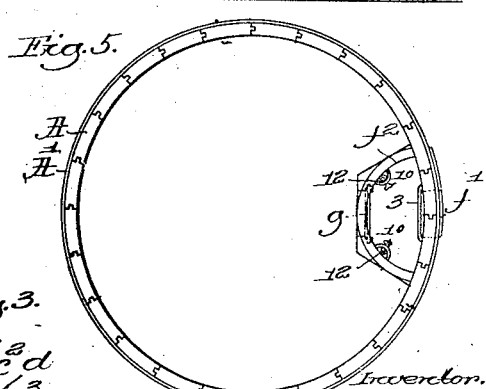

UNITED STATES PATENT OFFICE.

ALBERT T. STEARNS, OF BOSTON, MASSACHUSETTS; FREDERICK M. STEARNS, EDWARD S. TENNY, AND JAMES F. DUNBAR, TRUSTEES OF SAID ALBERT T. STEARNS, DECEASED, ASSIGNORS TO THE A. T. STEARNS LUMBER COMPANY, OF BOSTON, MASSACHUSETTS, A CORPORATION OF MASSACHUSETTS.

SILO.

No. 830,379.  Specification of Letters Patent.  Patented Sept. 4, 1906.

Application filed March 10, 1904. Serial No. 197,496.

*To all whom it may concern:*

Be it known that I, ALBERT T. STEARNS, a citizen of the United States, residing at Boston, in the county of Suffolk and State of Massachusetts, have invented an Improvement in Silos, of which the following description, in connection with the accompanying drawings, is a specification, like characters on the drawings representing like parts.

Heretofore silos having wooden exterior walls have been made open at one side from end to end and provided with a series of movable doors arranged one above the other, the edges of the exterior wall at opposite sides the opening being braced together.

My novel silo comprises an exterior wall having a passage-way leading from near the upper to the lower end thereof through which the ensilage may be discharged from the silo, the passage-way being so constructed as to be gradually shortened in length as the depth of ensilage is decreased.

To shorten the passage-way in one of the best forms now known to me, I have made the wall thereof in sections, so that one section after another may be removed as the depth of the ensilage decreases.

The passage-way is shown as having footholds that may be used as a ladder, so that a person may enter the passage-way at the bottom of the silo and climb up through said passage-way to get onto the top of the ensilage contained in the silo.

Figure 1 in vertical section shows a silo embodying my invention in one of the best forms now known to me. Fig. 2 is a cross-section of the silo on the line $x$, Fig. 1. Fig. 3 is a detail showing a locking device to retain a section of the passage-way in its locked position. Fig. 4 shows a modification of my invention in which the passage-way is located close to the outer wall of the silo, and Fig. 5 is a partial cross-section thereof in the line $x'$.

The outer wall A of the silo of any desired height and of any desired shape and area in cross-section—say from eight to sixteen feet across—may be made of wood or timber embraced by strong hoops A', capable of being drawn very closely about the wall to hold the timbers thereof in place.

The silo shown has a circular exterior wall; but it will be obvious that the shape of the exterior wall is immaterial.

The upper end of the silo is shown as having a roof B, comprising slanting beams $b$, united in any usual way.

The silo may be erected on a foundation B', of stone or brick or any material, said foundation having an opening $B^2$ in which may be run a wagon or anything that is to receive the ensilage from the silo as it is to be fed to stock.

The silo has a tube-like passage-way C, which in case the ensilage is to be delivered through the bottom $A^2$ of the silo is extended upwardly from said bottom to a point about level with the ensilage in the silo, it being supposed that the ensilage when the silo is filled will come about to the dotted line $y$.

The passage-way C is shown as composed of a series of short sections $c$, having, preferably, tongues and grooves to aid in retaining the different sections in place one on the other.

The upper end of the passage-way may and preferably will have a cover C', the latter fitting over and closing the open upper end of the passage-way after filling the silo, said cover remaining in position usually until the ensilage is to be taken from the silo.

When the silo is to be opened, of course the cover C' will be raised into the dotted-line position and will remain there, and the sections $c$ will be raised on the guides as required as the depth of the ensilage varies, and they will be locked in their elevated position.

The cover is shown as slidable on guide rods or ways $d$, represented as suspended from a cross-beam $d'$ of the roof, said rods being extended through the passage-way to the bottom of the silo, where the rods are held by any suitable means.

Each section $c$ of the passage-way also has one or more locking devices, represented as bolts having eyes $c^2$ to embrace said guide-rod, and a nut $c^3$, rotatable on a threaded part of the bolt, so that by turning the nut the clamping device may be drawn to cause the eye thereof to bind the rod so closely as to hold each section of the passage-way either in its operative position or its inoperative position as said section is elevated as the ensilage is discharged, so that the passage-way may be shortened to correspond with the depth of ensilage in the silo.

Within the passage-way I support in suitable manner a series of footholds $e$, shown as iron rods and serving as steps or rungs, as of a ladder.

A person may enter the passage-way at its lower end and engaging the rungs may climb therethrough to the upper end thereof, pushing up the cover and stepping out on the ensilage in the silo preparatory to attacking the ensilage with a shovel or fork to discharge the same from the silo through the passage-way.

The ensilage at the top of the silo may be thrown into the passage-way and fall to the bottom thereof, from which point it may be taken and fed to stock.

As the ensilage is fed out and the depth of the mass is decreased and the sections $c$ are lifted one after the other it will be understood that the outlet for the ensilage, which is the top of the passage-way, will always be in such position as to handle the ensilage with the least amount of labor.

In Fig. 4, showing a modification of my invention, the passage-way $f$ is located close to the exterior wall $F$ of the silo, said wall constituting a portion of the passage-way. The wall of the silo when the passage-way $f$ is used will have a door $f'$ at its lower end. The inner wall $f^2$ of the passage-way $f$ has a series of movable sections 2, made as doors, one located above the other, the lowermost of said doors being sustained by a platform or plank $f^3$, below which is another door $g$, that may be removed prior to removing the last of the ensilage from the silo. When it is desired to use the passage-way $f$, the door $f'$ will be removed and the person who is to discharge the ensilage will enter the passage-way $f$ and putting his foot on the rungs 3 will climb through the passage-way to the top of the ensilage and immediately commence to detach the ensilage and throw it into said passage-way to the bottom thereof, from which point it will be removed by a shovel or other usual means. As the depth of the ensilage decreases one section or door 2 after another is lifted and held up out of the way by suitable locking devices 10, such as described, which may coact with suitable rods 12. Finally the door $g$ will be opened and the ensilage at the bottom of the silo may be pushed out through the door $f'$.

Having described my invention, what I claim, and desire to secure by Letters Patent, is—

1. A silo having a sectional passage-way for the reception at its upper end of the ensilage, said passage-way leading the ensilage through the bottom thereof.

2. A silo having a sectional passage-way for the reception at its upper end of the ensilage, said passage-way leading the ensilage to the lower end of the silo, and guides for the sections comprising said passage-way.

3. A silo having a sectional passage-way for the discharge therethrough of ensilage, and means to lock the sections of the passage-way in their elevated inoperative positions one after the other as the length of the passage-way is shortened to accommodate the decreasing thickness of ensilage.

4. A silo having a tube-like sectional passage-way leading from the bottom of the silo through the ensilage therein, and guides to control the movement of said sections.

In testimony whereof I have signed my name to this specification in the presence of two subscribing witnesses.

ALBERT T. STEARNS.

Witnesses:
GEO. W. GREGORY,
FRANCIS S. LORD.